(12) United States Patent
Kanayama

(10) Patent No.: US 8,106,992 B2
(45) Date of Patent: Jan. 31, 2012

(54) AUTOMATIC FOCUSING SYSTEM USING A MAGNIFICATION OR REDUCTION OPTICAL SYSTEM

(75) Inventor: Atsushi Kanayama, Saitama (JP)

(73) Assignee: Fujinon Corporation, Saitama-Shi (JP)

(*) Notice: Subject to any disclaimer, the term of this patent is extended or adjusted under 35 U.S.C. 154(b) by 383 days.

(21) Appl. No.: 12/019,447

(22) Filed: Jan. 24, 2008

(65) Prior Publication Data
US 2008/0225159 A1 Sep. 18, 2008

(30) Foreign Application Priority Data
Mar. 14, 2007 (JP) ................ P2007-065658

(51) Int. Cl.
*H04N 5/225* (2006.01)
*H04N 5/228* (2006.01)

(52) U.S. Cl. ............... 348/335; 348/208.12

(58) Field of Classification Search .......... 348/218, 348/240, 333.01, 334, 335
See application file for complete search history.

(56) References Cited

U.S. PATENT DOCUMENTS

| 5,241,423 A * | 8/1993 | Chiu et al. ............... 359/727 |
| 5,703,716 A * | 12/1997 | Furuta ............... 359/431 |
| 6,008,844 A * | 12/1999 | Tsuda et al. ............ 348/333.02 |
| 6,822,801 B2 * | 11/2004 | Yahagi et al. ............ 359/634 |
| 7,030,927 B2 * | 4/2006 | Sasaki ............... 348/345 |
| 7,061,552 B1 * | 6/2006 | Patten et al. ............ 348/806 |
| 7,532,812 B2 * | 5/2009 | Nurishi ............... 396/82 |
| 7,570,299 B2 * | 8/2009 | Kuwakino ............ 348/345 |
| 2001/0010558 A1 * | 8/2001 | Yasuda ............ 348/350 |
| 2005/0195329 A1 * | 9/2005 | Takechi et al. ............ 348/556 |
| 2005/0231720 A1 * | 10/2005 | Goto ............ 356/399 |
| 2007/0035824 A1 * | 2/2007 | Scholz ............ 359/399 |
| 2009/0103088 A1 * | 4/2009 | Delmas et al. ............ 356/328 |

FOREIGN PATENT DOCUMENTS

| JP | 2000-330012 | 11/2000 |
| JP | 2002-365517 A | 12/2002 |

OTHER PUBLICATIONS

JP Office Action issued in corresponding JP Patent Application No. 2007-065658 dated Sep. 30, 2011.

* cited by examiner

*Primary Examiner* — Hung Lam

(74) *Attorney, Agent, or Firm* — Birch, Stewart, Kolasch & Birch, LLP

(57) ABSTRACT

A taking lens 10 of an automatic focusing system of an optical path length difference type is configured so that AF object light is branched from a main optical path that guides object light to a video imaging device 26 of a camera main body 14, and object images are formed on AF imaging devices 22A and 22B. A ⅔ type CCD is used as the video imaging device 26, and a ⅓ type CCD, that is easily available and cheap, is used as the AF imaging devices 22A and 22B. In view of that sizes of the AF imaging devices 22A and 22B are smaller than that of the video imaging device 26, the object images formed on the AF imaging devices 22A and 22B are reduced by a reduction optical system 17.

4 Claims, 6 Drawing Sheets

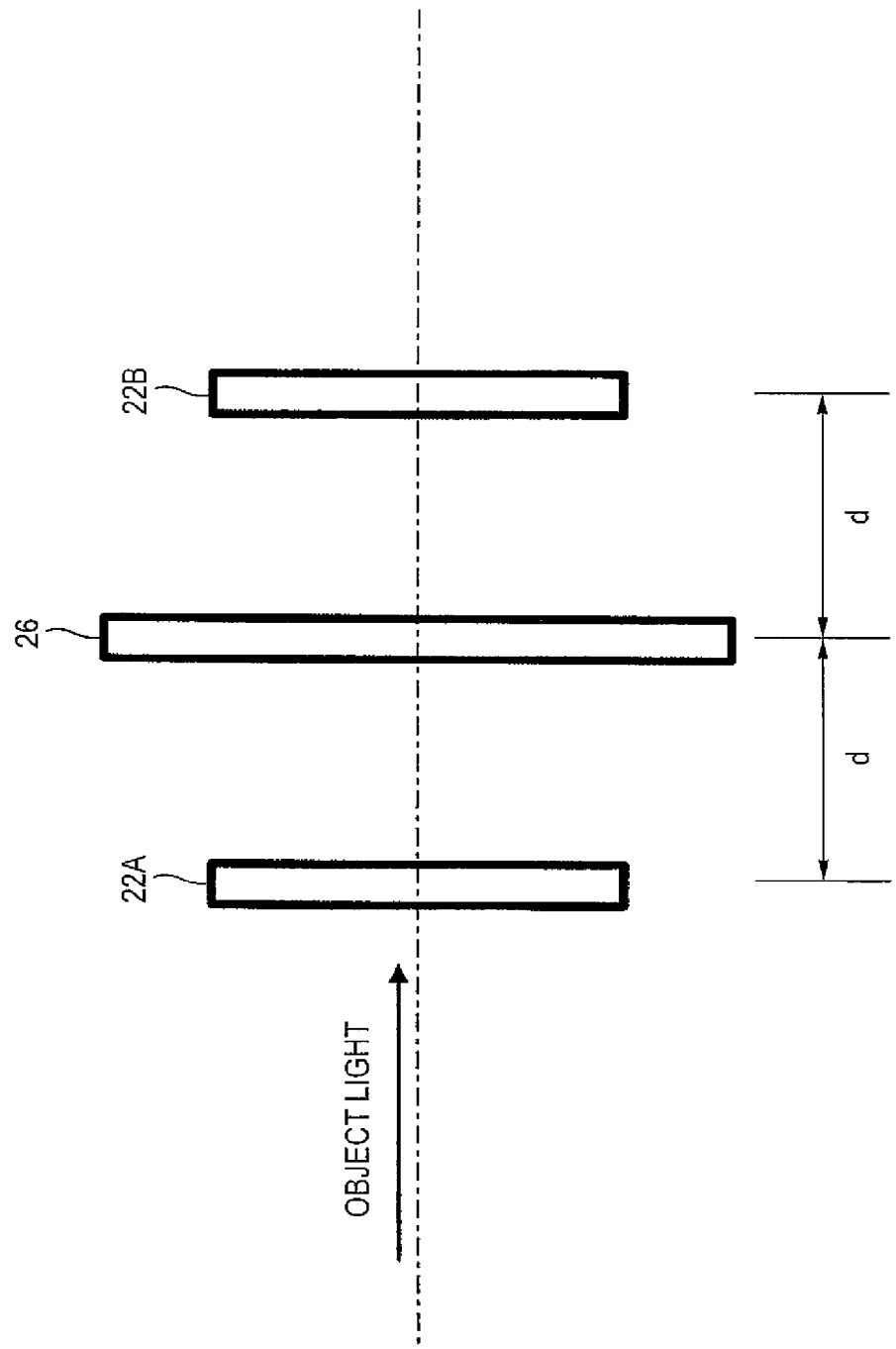

2/3 INCH

11mm 54.5%

1/3 INCH

6mm

AUTOMATIC FOCUSING SYSTEM USING A MAGNIFICATION OR REDUCTION OPTICAL SYSTEM

CROSS-REFERENCE TO RELATED APPLICATIONS

This application is based upon and claims the benefit of priority from the Japanese Patent Application No. 2007-65658 filed on Mar. 14, 2007; the entire contents of which are incorporated herein by reference.

BACKGROUND OF THE INVENTION

1. Technical Field

The invention relates to an automatic focusing system, and more particularly, to an automatic focusing system that employs an AF operation of an optical path length difference type for performing an automatic focusing operation based on contrasts of an object image imaged by a plurality of imaging surfaces having an optical path length difference thereamong.

2. Description of the Related Art

As an automatic focusing (AF) operation that is employed in television cameras for broadcasting or business, there is known an AF operation of a so-called optical path length difference type (for example, see JP 2002-365517 A (corresponding to U.S. Pat. No. 6,822,801)). For example, in an automatic focusing system employing the AF operation of the optical path length difference type, a light splitting optical system such as a half-mirror is disposed in a taking lens. An optical path of the taking lens is branched into a main optical path and an AF optical path. In the main optical path, an imaging device of a camera main body (in this specification, referred to as a "video imaging device") is disposed to record or reproduce video. Thus, the video for record or reproduction are imaged by the video imaging device.

In the AF optical path, a plurality of imaging surfaces of an imaging device(s) for AF (in this specification, referred to as an "AF imaging device(s)") are disposed so as to have an optical path length difference. There are (i) a case where a plurality of AF imaging devices form the plurality of imaging surfaces may be made in a plurality of AF imaging devices and (ii) a case where a single AF imaging device forms the plurality of imaging surfaces. Object light branched into the AF optical path is split by the light splitting optical system disposed in the AF optical path, and then it is incident on the imaging surfaces of the AF imaging device. As a result, the object image is imaged for each imaging surface, and thus an image signal for each imaging surface can be acquired from the AF imaging device. On the basis of the image signal for each imaging surface acquired in this manner, a contrast of the object image imaged for each imaging surface is provided as a focus evaluation value. Then, the focus evaluation values are compared with each other to detect a focusing state (e.g., in-focus, front-focus, rear-focus) of the taking lens with respect to an imaging surface of the video imaging device. The focus of the taking lens is controlled so as to change the focusing state to an in-focus state.

In television cameras, a ⅔ type CCD is generally used as an imaging device of a camera main body (a video imaging device). On the other hand, when the above-mentioned AF operation of the optical path length difference type is employed, a CCD having the same size as the video imaging device is used as the AF imaging device. This is because a range that is a target of the focusing operation (an AF area) is limited to a predetermined range (e.g., a rectangular range) in a photographing screen of the video imaging device and because the range of the AF area can be changed to a desired position or a desired size.

However, since the ⅔ type CCD has a large size and recent imaging devices (a CCD or CMOS sensor) are miniaturized, there arises a problem that it is different to acquire the ⅔ type CCD.

SUMMARY OF THE INVENTION

The invention has been made in view of the above circumstances and provides an automatic focusing system that has an AF imaging device as well as a video imaging device of a camera main body and enables easy acquisition of the AF imaging device, cost reduction and system miniaturization.

According to an aspect of the invention, an automatic focusing system includes a taking optical system, a light splitting optical system, an AF imaging device, a focus control unit, an AF optical path and a magnification/reduction optical system. The taking optical system forms an object image on a video imaging device of a camera main body. The light splitting optical system splits object light for automatic focusing, from the taking optical system. The AF imaging device images the object image formed by the object light for automatic focusing split by the light splitting optical system. The focus control unit that controls focus of the taking optical system based on the object image imaged by the AF imaging device so that the taking optical system is in an in-focus state. The object light for automatic focusing split by the light splitting optical system passes through the AF optical path. The magnification/reduction optical system is disposed in the AF optical path. The magnification/reduction optical system magnifies or reduces the object image formed on the AF imaging device.

With this configuration, a size of the object image formed on the AF imaging device is adjusted by the magnification/reduction optical system, independently from the video imaging device. Accordingly, it is advantageous in that the imaging device having a desired size can be used as the AF imaging device.

Also, a size of the video imaging device may be different from that of the AF imaging device. The magnification/reduction optical system may magnify or reduce the object image formed on the AF imaging device so that the object image imaged by the video imaging device matches the object image imaged by the AF imaging device.

This configuration shows a mode in which the size of the AF imaging device is different from that of the video imaging device.

Also, the AF imaging device may include one or more imaging devices having a plurality of imaging surfaces disposed in positions that are different in optical path length.

The configuration shows a mode in which the automatic focusing operation of the so-called optical path length difference type is employed.

According to the automatic focusing system set forth above, in the automatic focusing system including the AF imaging device as well as the video imaging device of the camera main body, it becomes possible to easily acquire the AF imaging device, reduce cost and miniaturize the system.

BRIEF DESCRIPTION OF THE DRAWINGS

FIG. 2 is a view used to explain an optical path length difference between AF imaging devices.

DETAILED DESCRIPTION OF EMBODIMENTS OF THE INVENTION

Hereinafter, an automatic focusing system according to embodiments of the invention will be described in detail with reference to the accompanying drawings.

Figure 1:
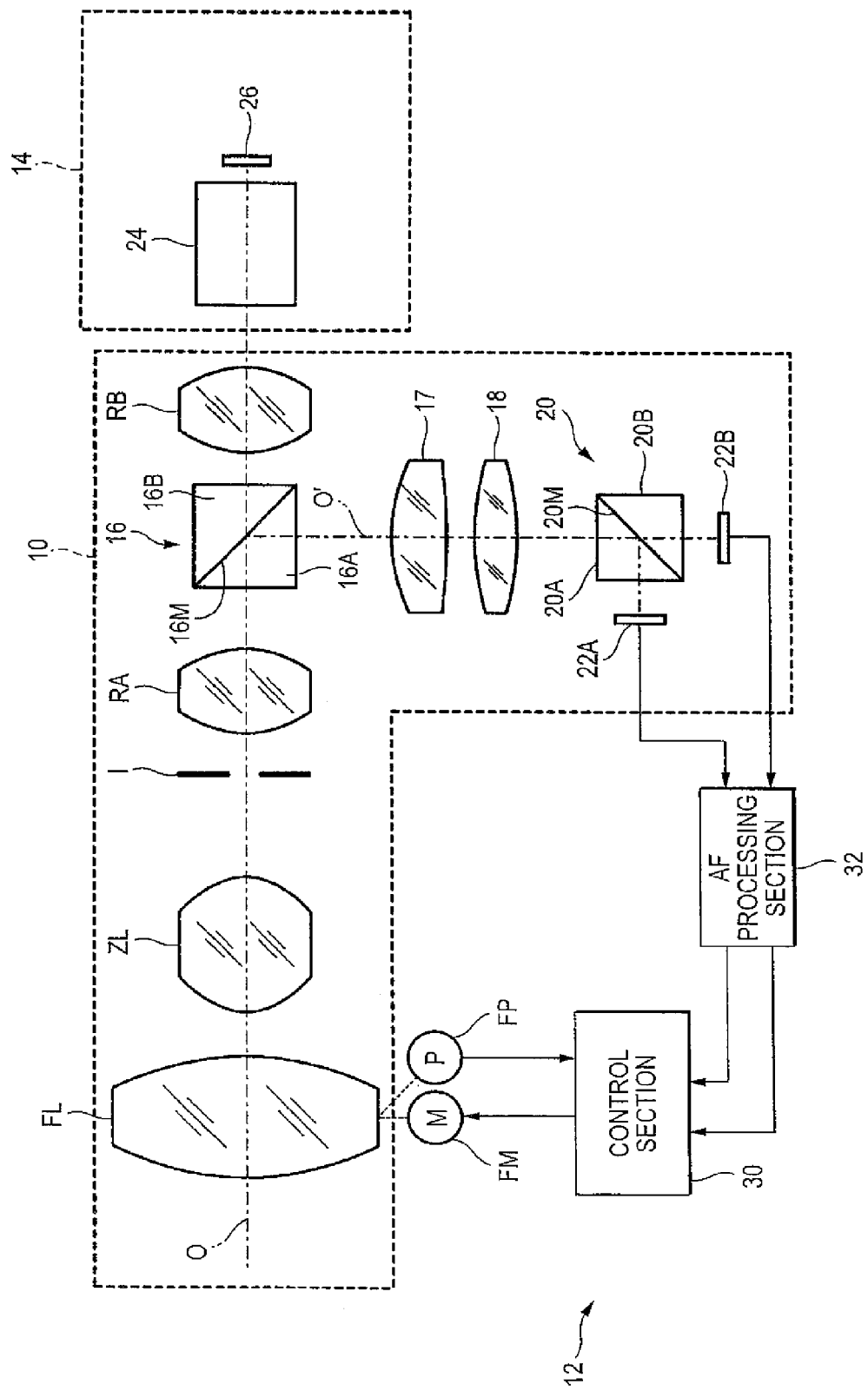
FIG. 1 is a block diagram illustrating the configuration of a lens system to which An automatic focusing system according to an embodiment of the invention is applied.

FIG. 1 is a block diagram illustrating the configuration of a lens system to which An automatic focusing system according to the embodiment of the invention is applied. The lens system in the figure includes a taking lens 10 (a taking optical system) mounted, through a lens mount, on a camera main body 14 (a camera head) of a television camera for broadcasting or business and a control system 12 for controlling the taking lens 10. The taking lens 10 and the control system 12 may be integrated, except a part of them, into a single lens device or may be configured separately from each other. In this manner, devices of the system may employ any configuration.

In the taking lens 10, a focus lens (group) FL, a zoom lens (group) ZL, an iris diaphragm I, and a relay lens (a relay optical system) having a front relay lens (group) RA and a rear relay lens (group) RB are arranged in order in a main optical path along an optical axis O. The focus lens FL and the zoom lens ZL are lens groups that are movable in a direction of the optical axis. When the focus lens FL moves, a focusing position (an object distance) changes, and when the zoom lens ZL moves, a zoom magnification (a focal length) changes. The iris diaphragm I performs opening and closing operations, and a brightness of an image changes in accordance with an opening and closing degree of the iris diaphragm I.

Object light being incident on the taking lens 10 and passing through the main optical path in the optical systems is incident on an optical system of the camera main body 14. The optical system of the camera main body 14 includes: a color separation optical system 24 for separating the object light, which is incident from the taking lens 10, into three wavelengths of R (red), G (green), and B (blue); and a video imaging device (CCD) 26 for each of R, G, and B for imaging images of the separated object light of each color. The video imaging devices of R, G, and B are disposed in positions so as to have optical path lengths that are optically equivalent to each other and are represented by a single video imaging device 26 as shown in the figure. The object light incident on an imaging surface of the video imaging device 26 is photoelectrically converted by the video imaging device 26 to generate a recording or reproducing image signal by a predetermined signal processing circuit in the camera main body 14.

Between the front relay lens RA and the rear relay lens RB of the relay optical system of the taking lens 10, a light splitting optical system 16 is disposed. The light splitting optical system 16 includes a first prism 16A and a second prism 16B. A half mirror surface 16M is formed in a position where the first prism 16A is coupled to the second prism 16B.

An AF optical path is branched from the main optical path of the taking lens 10 by the half mirror surface 16M.

Of the object light incident on the taking lens 10, object light going through the half mirror 16M of the light splitting optical system 16 passes through the main optical path along the optical axis O as main object light, and then is guided to the camera main body 14. On the other hand, object light reflected by the half mirror 16M of the light splitting optical system 16 is guided to the AF optical path along an optical axis O' substantially perpendicular to the optical axis O, as AF object light. A light intensity ratio of the transmission light to the reflection light, which Are split from the incident light incident on the half mirror 16M, is not necessarily equivalent (1:1), but, for example, the light intensity of the reflection light that becomes the AF object light is smaller than that of the transmission light.

In the AF optical path, a reduction optical system 17, a relay lens (group) 18, a light splitting optical system 20 including a first prism 20A and a second prism 20B and an AF imaging devices 22A and 22B are disposed.

The object light, which is split by the light splitting optical system 16 and guided to the AF optical path, passes through the reduction optical system 17 and the relay lens 18 and is then incident on the light splitting optical system 20. The reduction optical system 17 is an optical system for reducing a size of an object image formed after the light passes through the relay lens 18, and details thereof will be described later.

The object light incident on the light splitting optical system 20 is split into two object light that are equivalent in their light intensities, by a half mirror 20M disposed in a position where the first prism 20A is coupled to the second prism 20B. The object light reflected by the half mirror 20M is incident on an imaging surface of the AF imaging device 22A, and the object light passing through the half mirror 20M is incident on an imaging surface of the AF imaging device 22B.

FIG. 2 is a view illustrating the video imaging device 26 of the camera main body 14 and the AF imaging devices 22A and 22B on the same optical axis. As shown in the figure, an optical path length of the object light incident on the one AF imaging device 22A is set to be shorter than that of the object light incident on the other AF imaging device 22B. An optical path length of the object light incident on the imaging surface of the video imaging device 26 is set to be therebetween. That is, the pair of the AF imaging devices 22A and 22B (imaging surfaces of the AF imaging devices 22A and 22B) are disposed at an equal distance d from the respective imaging surfaces of the video imaging device 26.

Figure 3A:
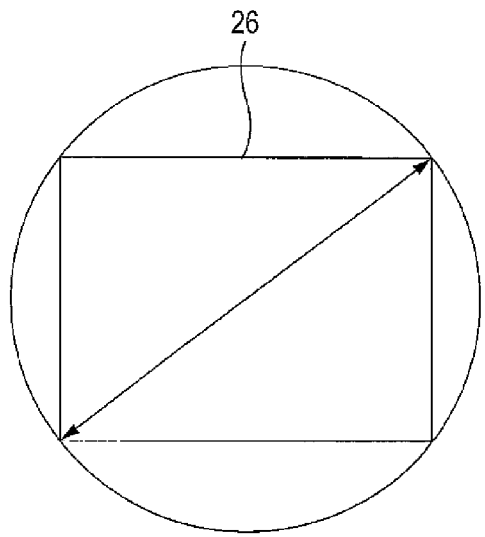
FIGS. 3(A) and 3(B) are views illustrating a size of a video imaging device and a size of an AF imaging device.
Figure 3B:
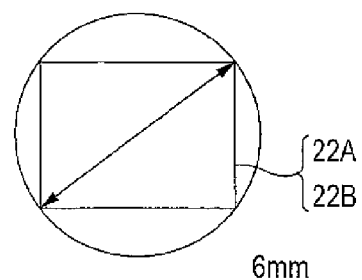

Also, a CCD having ⅔ inches in size (diagonal 11 mm) is used as the video imaging device 26 as shown in FIG. 3(A), and a CCD having ⅓ inches in size (diagonal 6 mm) is used as the AF imaging devices 22A and 22B as shown in FIG. 3(b). The reasons why the sizes of the AF imaging devices 22A and 22B are different from that of the video imaging device 26 are that the ⅓ type CCD is acquired more easily, is cheaper, and is smaller than the ⅔ type CCD, which is used as the video imaging device 26.

Moreover, since the sizes of the AF imaging devices 22A and 22B are smaller than that of the video imaging device 26, the object images formed on the imaging surfaces of the AF imaging devices 22A and 22B are reduced by the reduction optical system 17 so as to be smaller than the object image formed on the imaging surface of the video imaging device 26. That is, since the sizes of the AF imaging devices 22A and 22B are equivalent to 54.5 percent of the size of the video imaging device 26, the sizes of the object images imaged by the AF imaging devices 22A and 22B are reduced by the reduction optical system 17 so as to be 54.5 percent of the size of the object image imaged by the video imaging device 26.

With this configuration, images equivalent to images that are taken when imaging surfaces are disposed in positions at an equal distance from the imaging surface of the video imaging device 26 can be obtained by the pair of AF imaging devices 22A and 22B.

It is not necessary that the AF imaging devices 22A and 22B form color images. In this embodiment, monochrome image signals (luminance signals) are acquired from the AF imaging devices 22A and 22B.

The focus lens FL of the taking lens 10 shown in FIG. 1 is electrically controlled by the control system 12. The focus lens FL is connected to a motor FM and a potentiometer FP, and a rotational speed of the motor FM is controlled by a control section 30 of the control system 12. Also, by supplying position information of the focus lens FL detected by the potentiometer FP to the control section 30, the control section 30 controls a position and an operating speed of the focus lens FL. The control section 30 also controls movable optical members such as the zoom lens ZL and the iris diaphragm I. However, the description thereof will be omitted herein.

The control of the focus lens FL (focus control) performed by the control section 30 includes, for example, a manual focus (MF) mode and an automatic focus (AF) mode. Any one of the modes is selected by a switch (not shown) When the MF mode is selected, the control section 30 controls the focus lens FL in accordance with an instruction signal from a focus controller (not shown) manually manipulated by, for example, a cameraman.

On the other hand, when the AF mode is selected, the control section 30 controls the focus lens FL based on focus evaluation value information input from an AF processing section 32, and brings an object into focus automatically.

Figure 4:
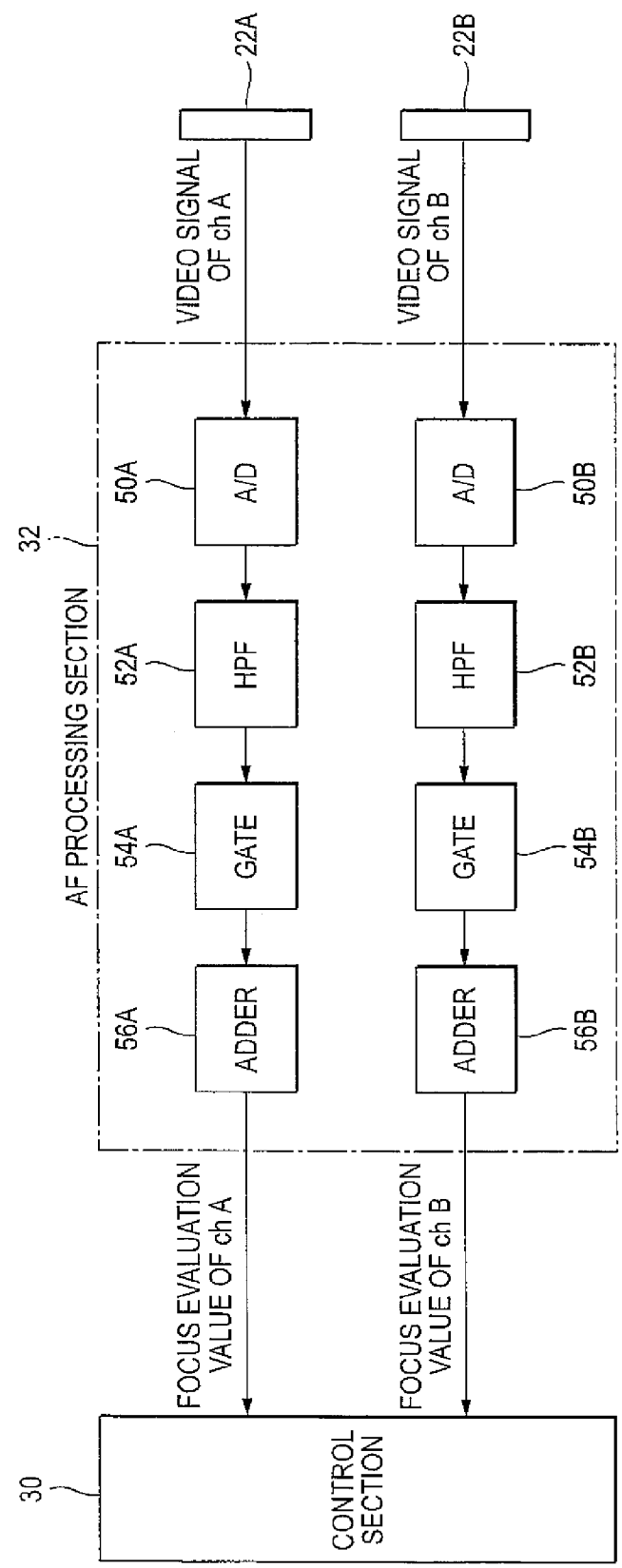
FIG. 4 is a block diagram illustrating the configuration of an AF processing section.

The control in the AF mode will be described in detail. In the AF mode, the control section 30 acquires from the AF processing section 32 focus evaluation values indicating degrees of contrast of the object images imaged by the AF imaging devices 22A and 22B. FIG. 4 is a block diagram illustrating the configuration of the AF processing section 32. In the pair of AF imaging devices 22A and 22B having the imaging surfaces, which Are optically disposed at the equal distance from the imaging surface of the video imaging device 26 as shown in FIG. 2, the object images there pass through the AF optical path and are formed on the imaging surfaces of the AF imaging devices 22A and 22B are converted into electrical signals at a field period and are output as image signals. The image signals are input to the AF processing section 32. The image signal acquired from the AF imaging device 22A is referred to as an image signal of chA, and the image signal acquired from the AF imaging device 22B is referred to as an image signal of chB.

The AF processing section 32 includes an A/D converter 5A, a highpass filter (HPF) 52A, a gate circuit 54A and an adder circuit 56A for processing the image signal of chA. Also, the AF processing section 32 includes an A/D converter 50B, a highpass filter (HPF) 52B, a gate circuit 54B and an adder circuit 56B for processing the image signal of chB. The circuits 50A to 56A for processing the image signal of chA and the circuits 50B to 56B for processing the image signal of chB perform an identical processing operation. Therefore, only the processing operations of the circuits 5A to 56A for the image signal of chA will be described below. The image signal of chA input to the AF processing section 32 is first converted into a digital signal by the A/D converter 50A. Then, only a signal having a high-frequency component is extracted by the HPF 52A from the digitalized image signal.

Subsequently, the image signal having the high-frequency component is input to the gate circuit 54A. Only an image signal within a range corresponding to a predetermined AF area (for example, a rectangular area at the center of a screen) set in a shooting range (screen) is extracted. The image signal in the AF area extracted by the gate circuit 54A is input to the adding circuit 56A, and added in unit of one field (one frame).

The integration values acquired by the adder circuits 56A and 56B are focus evaluation values indicating degrees of contrast of the object images imaged by the AF imaging devices 22A and 22B, and read to the control section 30. The focus evaluation value obtained from the image signal of chA is referred to as a focus evaluation value of chA, and the focus evaluation value obtained from the image signal of chB is referred to as a focus evaluation value of chB.

Figure 5:
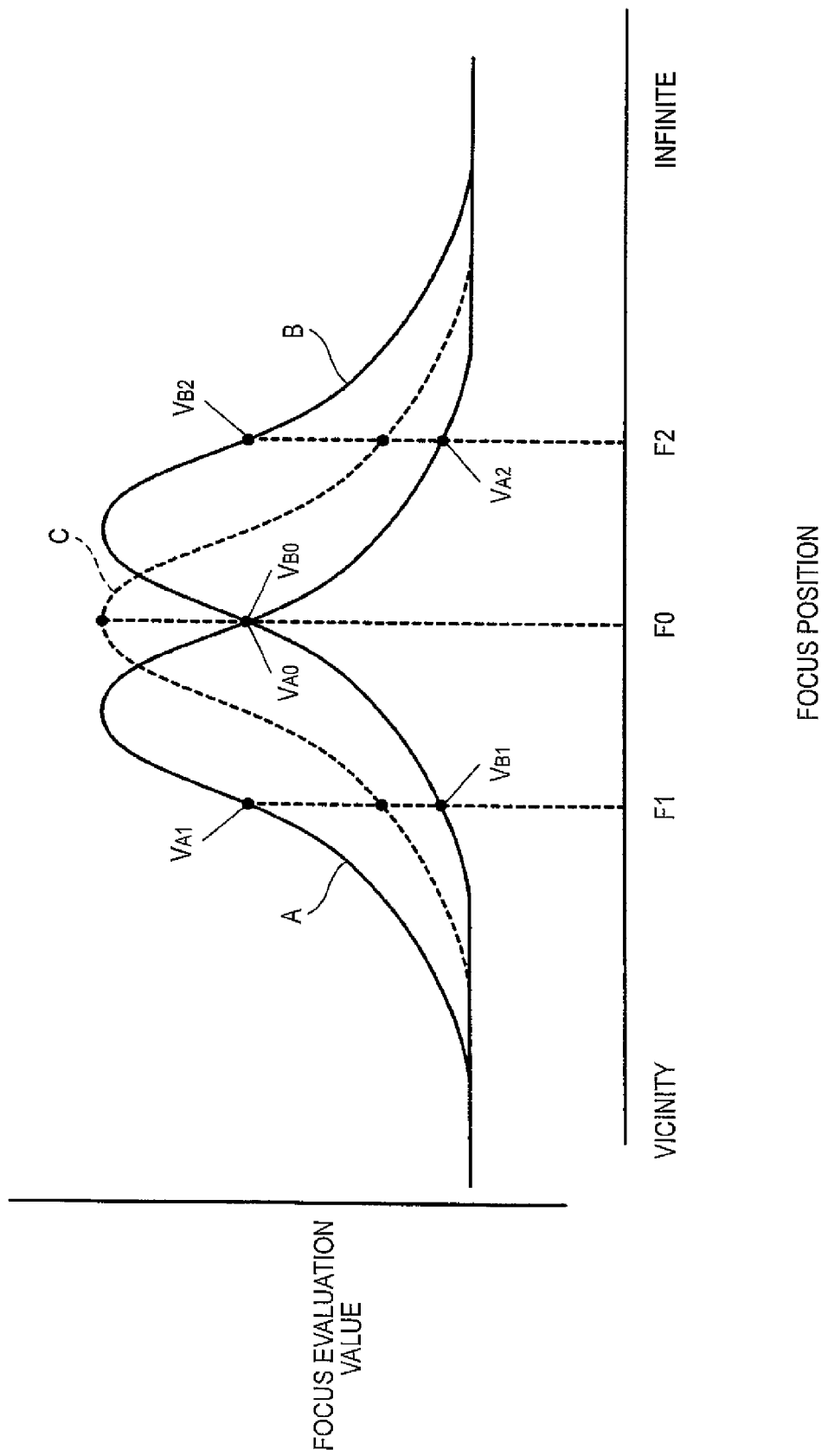
FIG. 5 is a graph illustrating a relationship between a focus position of a taking lens and a focus evaluation value acquired by the pair of AF imaging devices.

The control section 30 detects a focusing state of the taking lens 10 with respect to the video imaging device 26, based on the focus evaluation value of chA and the focus evaluation value of chB acquired from the AF processing section 32. The detection of the focusing state is performed as follows. FIG. 5 is a graph illustrating a relationship between a focus position and a focus evaluation value when an object is imaged. The position of the focus lens FL of the taking lens (focus position) is taken as a vertical axis and the focus evaluation value is taken as a longitudinal axis. Curved lines A and B indicated by the solid lines in the figure represent the focus evaluation values of chA obtained from the image signals of chA and the focus evaluation values of chB obtained from the image signals of chB, with respect to the focus position, respectively. A curved line C indicated by the dotted line in the figure represents the focus evaluation values with respect to the focus position when the focus evaluation value is obtained from the image signal acquired from the video imaging device 26.

In the figure, the focusing state becomes an in-focus state when the focus is set to a focus position F0 where the focus evaluation value of the video imaging device 26 indicated by the curved line C is the largest (maximum). When the focus of the taking lens 10 is set to a focus position F1 on the vicinity side of the in-focus position F0, the focus evaluation value of chA takes a value $V_{A1}$ on the curved line A corresponding to the focus position F1, and the focus evaluation value of chB takes a value $V_{B1}$ on the curved line B corresponding to the focus position F1. In this case, as shown in the figure, the focus evaluation value $V_{A1}$ of chA is larger than the focus evaluation value $V_{B1}$ of chB. Accordingly, when the focus evaluation value $V_{A1}$ of chA is larger than the focus evaluation value $V_{B1}$ of chB, it is understood that the focus is set to the vicinity side of the in-focus position F0, that is, to be in a front-focus state.

On the other hand, when the focus of the taking lens 10 is set to a focus position F2 on the infinite side of the in-focus position F0, the chA focus evaluation value is a value $V_{A2}$ of the curved line A corresponding to the focus position F2, and the chB focus evaluation value is a value $V_{B2}$ of the curved line B corresponding to the focus position F2. In this case, the focus evaluation value $V_{A2}$ of chA is smaller than the focus evaluation value $V_{B2}$ of chB. Accordingly, when the focus evaluation value $V_{A2}$ of chA is smaller than the focus evaluation value $V_{32}$ of chB, it is understood that the focus is set to the infinite side of the in-focus position F0, that is, to be in a rear-focus state.

When the focus of the taking lens 10 is set to the focus position F0, that is, to the in-focus position, the focus evaluation value of chA takes a value $V_{A0}$ on the curved line A corresponding to the focus position F0, and the focus evaluation value of chB takes a value $V_{B0}$ on the curved line B corresponding to the focus position F0. In this case, the focus evaluation value $V_{A0}$ of chA is equal to the focus evaluation value $V_{B0}$ of chB. Accordingly, when the focus evaluation value $V_{A0}$ of chA is equal to the focus evaluation value $V_{B0}$ of chB, it is understood that the focus is set to the in-focus position F0, that is, to be in the in-focus state.

The control section 30 controls the focus lens FL while detecting, based on the focus evaluation value of chA and the focus evaluation value of chB, which of the front-focus state, the rear-focus state, and the in-focus state a current focusing state of the taking lens 10 is in with respect to the video imaging device 26. For example, when the focusing state detected based on the focus evaluation value of chA and the focus evaluation value of chB is in the front-focus state, the focus lens FL is moved in the infinite direction. When the focusing state is in the rear-focus state, the focus lens FL is moved in the vicinity direction. When the focusing state is in the in-focus state, the focus lens FL is stopped. Thereby, the focus lens FL is moved to and stopped at a position where the focusing state of the taking lens 10 is in the in-focus state.

In the above-described embodiments, the sizes of the AF imaging devices 22A and 22B are smaller than that of the video imaging device 26. However, there is a case where the sizes of the AF imaging devices 22A and 22B is larger than that of the video imaging device 26. In this case, a magnification optical system for magnifying the object images formed on the imaging surfaces of the AF imaging devices 22A and 22B may be disposed in place of the reduction optical system 17 of the AF optical path shown in FIG. 1, so that an image having a field angle equivalent to that of an image imaged by the video imaging device 26 is imaged by the AF imaging devices 22A and 22B.

Further, in the above-described embodiments, the two AF imaging devices 22A and 22B are disposed. However, the invention may be applicable to the case where one AF imaging device or three or more AF imaging devices are disposed. When one AF imaging device is disposed, the AF operation of the optical path length difference type is not applied, but an AF operation of the general contrast type is applied. Also, it is possible to form, in one AF imaging device, a plurality of imaging surfaces that are disposed in positions having an optical path length difference. The number of the imaging surfaces disposed in the positions having the optical path length difference may not be equal to the number of the AF imaging devices.

Even if the size of the video imaging device 26 is different from or equal to those of the AF imaging devices 22A and 22B, it is advantageous to provide the zoom optical system so as to change the size of the object image in the AF optical path. For example, when the target range of the focusing operation i.e., the AF area is limited to a part of the range of a field angle in the AF mode, the object image within the AF area range is optically magnified, and the magnified object image is imaged by the AF imaging devices 22A and 22B. Thus, it is possible to perform the AF operation with high accuracy.

When such a zoom optical system is disposed, the zoom optical system that is movable in a direction of the optical axis O' is disposed in place of the reduction optical system 17 shown in FIG. 1. By controlling the position of the zoom optical system, the sizes of the object images formed on the imaging surfaces of the AF imaging devices 22A and 22B, that is, the focal distances of the AF optical path can be changed.

Figure 6:
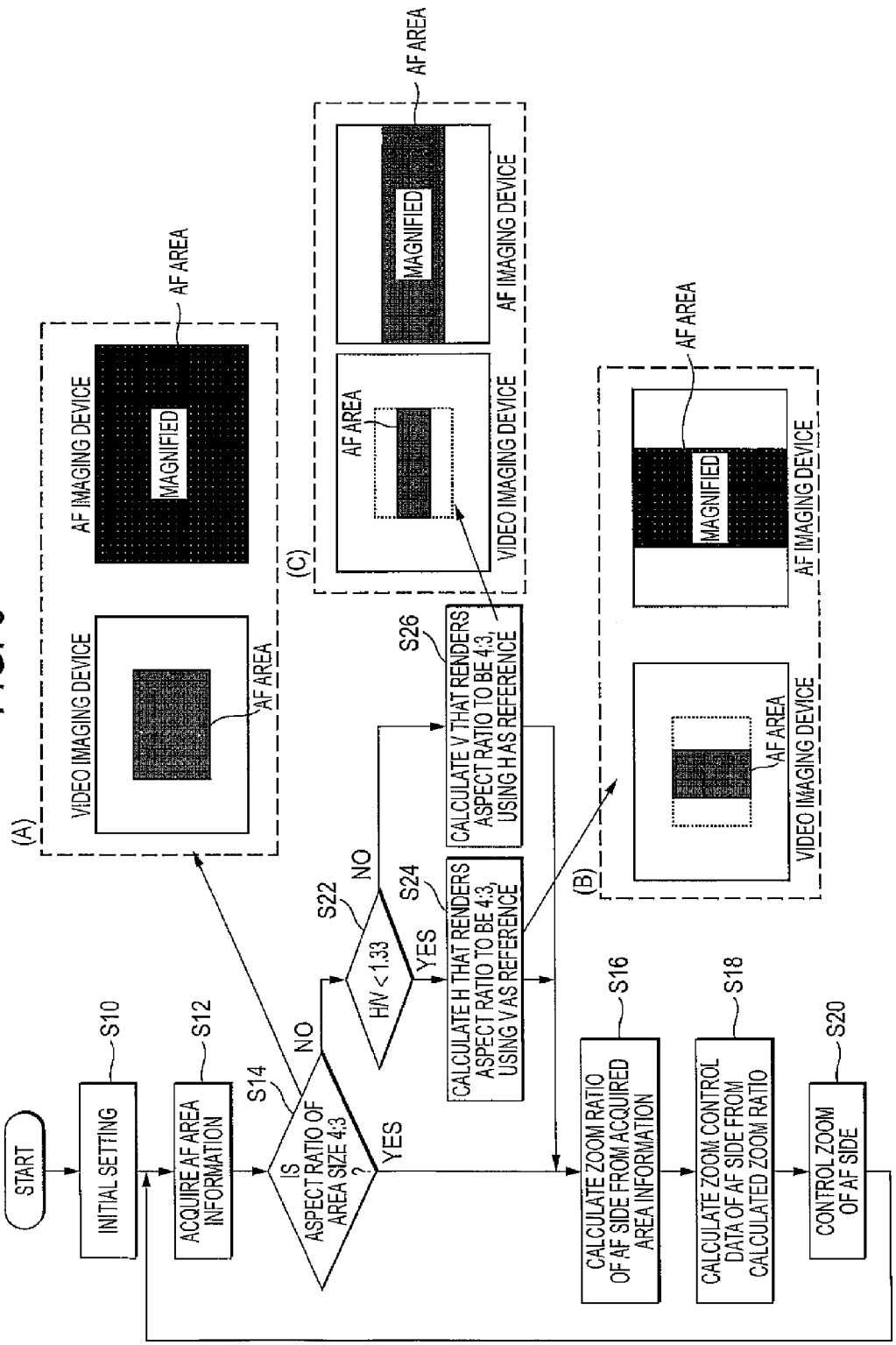
FIG. 6 is a flow chart illustrating an embodiment in which A zoom optical system is disposed in an AF optical path.

FIG. 6 is a flow chart illustrating the processing operations of the control section 30 when the above-described zoom optical system is disposed in the AF optical path shown in FIG. 1. First, after a predetermined initial setting is performed (Step S10), AF area information is acquired (Step S12). In the processing of this embodiment, it is assumed that an operator can change settings of the size and aspect ratio of the AF area by operating a predetermined manipulation member. Information relating to the settings of the AF area is acquired.

Next, it is determined as to whether or not the aspect ratio of the area is equal to 4(H):3(V) (step S14). It is also assumed that the aspect ratio of the AF imaging device is 4(H):3(V).

In step S14, when the determination result is YES, for example, when the aspect ratio of the AF area is set to 4:3 within the imaging field angle of the video imaging device as shown in FIG. 6(A), a zoom ratio on the AF optical path side is calculated based on the AF area information acquired in step S12 (Step S16). That is, as shown by the AF imaging device in FIG. 6(A), the zoom ratio for matching the entire imaging field angle of the AF imaging device to the field angle of the AF area of the video imaging device is calculated.

On the basis of the zoom ratio calculated in step S16, zoom control data for the AF optical path is calculated (Step S18), and the zoom optical system of the AF optical path is controlled based on the zoom control data so as to be set at the zoom ratio calculated in step S16 (Step S20). Thereafter, the processing returns to step S12.

In step S14, if the determination result is NO, it is subsequently determined as to whether or not the aspect ratio of the AF area (H/V) is less than 1.33 (step S22). When the determination result is YES, for example, when the AF area, which is long in the vertical direction, is set within the imaging field angle of the video imaging device 26 as shown in FIG. 6(B), a length in the horizontal direction is calculated using the length of the AF area in the vertical direction as a reference (fixed) so that the aspect ratio (H:V) becomes 4:3 (step S24). That is, the smallest area that includes the AF area and has the aspect ratio of 4:3 is obtained. While the obtained area having the aspect ratio of 4:3 is regarded as the AF area, the processing of step S16 is performed as in the case where the determination result in step S14 is YES. Accordingly, as shown in the AF imaging device of FIG. 6(B), the zoom optical system is set so as to match the entire imaging field angle of the AF imaging device to the field angle of the area having the aspect ratio of 4:3 of the video imaging device, which is regarded as the AF area.

In step S22, when the determination result is NO, for example, when the AF area, which is long in the horizontal direction, is set within the imaging field angle of the video imaging device as shown in FIG. 6(C), a length in the vertical direction is calculated using the length of the AF area in the horizontal direction as a reference (fixed) so that the aspect ratio (H:V) is 4:3 (step S26). That is, the smallest area that includes the AF area and has the aspect ratio of 4:3 is obtained. The obtained area having the aspect ratio of 4:3 is regarded as the AF area, and the processing of step S16 is performed as in the case where the determination result in step S14 is YES. Accordingly, as shown in the AF imaging device of FIG. 6(C), the zoom optical system is set so as to match the entire imaging field angle of the AF imaging device to the field angle of the area, having the aspect ratio of 4:3, of the video imaging device, that is regarded as the AF area.

What is claimed is:
1. An automatic focusing system comprising:
a taking optical system that forms an object image on a video imaging device of a camera main body;
a first light splitting optical system that splits object light for automatic focusing, from the taking optical system;
an AF imaging device that images the object image formed by the object light for automatic focusing;

a focus control unit that controls focus of the taking optical system based on the object image imaged by the AF imaging device so that the taking optical system is in an in-focus state;

an AF optical path through which the object light for automatic focusing split by the first light splitting optical system passes;

a magnification/reduction optical system disposed in the AF optical path, the magnification/reduction optical system magnifies or reduces the object image formed on the AF imaging device; and a second light splitting optical system that further splits the object light split by the first light splitting optical system and passed through the magnification/reduction optical system, wherein a size of the video imaging device is different from that of the AF imaging device, the magnification/reduction optical system magnifies or reduces the object image formed on the AF imaging device so that the object image imaged by the video imaging device matches the object image imaged by the AF imaging device, and the AF imaging device includes a plurality of imaging devices that accept the object light split by the second light splitting optical system.

2. The automatic focusing system according to claim 1, wherein the AF imaging device includes one or more imaging devices having a plurality of imaging surfaces disposed in positions that are different in optical path length.

3. An automatic focusing system comprising:
a taking optical system that forms an object image on a video imaging device of a camera main body;
a light splitting optical system that splits object light for automatic focusing, from the taking optical system;
an AF imaging device that images the object image formed by the object light for automatic focusing split by the light splitting optical system;
a focus control unit that controls focus of the taking optical system based on the object image imaged by the AF imaging device so that the taking optical system is in an in-focus state;
an AF optical path through which the object light for automatic focusing split by the light splitting optical system passes; and
a magnification/reduction optical system disposed in the AF optical path, the magnification/reduction optical system that magnifies or reduces the object image formed on the AF imaging device,
wherein said magnification/reduction optical system calculates a change for an image size for the AF optical path side based on a comparison of an aspect ratio associated with the video imaging device, and an aspect ratio associated with the AF imaging device.

4. The automatic focusing system according to claim 3, wherein the AF imaging device includes one or more imaging devices having a plurality of imaging surfaces disposed in positions that are different in optical path length.

* * * * *